United States Patent
Nair et al.

(10) Patent No.: US 12,184,790 B2
(45) Date of Patent: Dec. 31, 2024

(54) NETWORK FUNCTION AUTHENTICATION BASED ON PUBLIC KEY BINDING IN ACCESS TOKEN IN A COMMUNICATION SYSTEM

(71) Applicant: Nokia Technologies Oy, Espoo (FI)

(72) Inventors: Suresh Nair, Whippany, NJ (US); Anja Jerichow, Grafing bei München (DE); Nagendra S Bykampadi, Karnataka (IN)

(73) Assignee: Nokia Technologies Oy, Espoo (FI)

( * ) Notice: Subject to any disclaimer, the term of this patent is extended or adjusted under 35 U.S.C. 154(b) by 653 days.

(21) Appl. No.: 17/267,243

(22) PCT Filed: Aug. 2, 2019

(86) PCT No.: PCT/FI2019/050574
§ 371 (c)(1),
(2) Date: Feb. 9, 2021

(87) PCT Pub. No.: WO2020/030852
PCT Pub. Date: Feb. 13, 2020

(65) Prior Publication Data
US 2021/0234706 A1 Jul. 29, 2021

(30) Foreign Application Priority Data
Aug. 10, 2018 (IN) .............................. 201841030136

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/3213* (2013.01); *H04L 9/3247* (2013.01)

(58) Field of Classification Search
CPC ... H04L 9/3263; H04L 9/0825; H04L 9/3213; H04L 9/3247
See application file for complete search history.

(56) References Cited

U.S. PATENT DOCUMENTS

2014/0095865 A1     4/2014  Yerra et al.
2017/0289197 A1*  10/2017  Mandyam ............... H04L 63/10

FOREIGN PATENT DOCUMENTS

| WO | WO-2018013925 A1 * | 1/2018 | ............. H04L 63/20 |
| WO | WO-2019034268 A1 * | 2/2019 | ............. H04W 48/18 |
| WO | WO-2019147436 A1 * | 8/2019 | ............... G06F 8/65 |

OTHER PUBLICATIONS

Extended European Search Report received for corresponding European Patent Application No. 19847710.1, dated Mar. 31, 2022, 10 pages.

(Continued)

*Primary Examiner* — Jeffrey C Pwu
*Assistant Examiner* — Mayasa A. Shaawat
(74) *Attorney, Agent, or Firm* — Barta Jones, PLLC

(57) ABSTRACT

A request is received at an authorization entity for access to a service producer by a service consumer. The request comprises a public key of the service consumer. The authorization entity generates an access token with the public key of the service consumer bound thereto. The authorization entity sends the access token to the service consumer. The service consumer digitally signs the access token using a private key that corresponds to the public key bound to the access token to form a digital signature. The service consumer sends the access token with the public key bound thereto and the digital signature to the service producer. The service producer validates the access token, obtains the public key from the access token, and verifies the digital signature using the obtained public key of the service (Continued)

consumer. The service consumer is authorized when the access token is successfully validated and the digital signature is successfully verified.

20 Claims, 5 Drawing Sheets

(56) References Cited

OTHER PUBLICATIONS

Campbell et al.,"OAuth 2.0 Mutual TLS Client Authentication and Certificate Bound Access Tokens draft-ietf-oauth-mtls-10", OAuth Working Group, Internet-Draft, Jul. 17, 2018, pp. 1-21.
Hardt, "The OAuth 2.0 Authorization Framework", Internet Engineering Task Force (IETF), RFC 6749, Oct. 2012, pp. 1-76.
"OAuth based service authorization framework for SBA", 3GPP TSG SA WG3 (Security) Meeting #90Bis, S3-180680, Agenda Item: 4.1.13.5, Nokia, Feb. 26-Mar. 2, 2018, 6 pages.
"3rd Generation Partnership Project; Technical Specification Group Services and System Aspects; Security architecture and procedures for 5G system (Release 15)", 3GPP TS 33.501, V15.1.0, Jun. 2018, pp. 1-152.
"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.
Jones et al., "JSON Web Token (JWT)", Internet Engineering Task Force (IETF), RFC 7519, May 2015, pp. 1-30.
Jones, "JSON Web Key (JWK)", Internet Engineering Task Force (IETF), RFC 7517, May 2015, pp. 1-40.
International Search Report and Written Opinion received for corresponding Patent Cooperation Treaty Application No. PCT/FI2019/050574, dated Nov. 8, 2019, 15 pages.
"3rd Generation Partnership Project; Technical Specification Group Services and System Aspects; Security Aspects; Study on security aspects of the 5G Service Based Architecture (SBA) (Release 15)", 3GPP TR 33.855, V1.0.1, Jul. 2018, pp. 1-41.
Office action received for corresponding Indian Patent Application No. 201841030136, dated Nov. 15, 2022, 8 pages.
Cooper et al., "Internet X.509 Public Key Infrastructure Certificate and Certificate Revocation List (CRL) Profile", Network Working Group, RFC 5280, May 2008, pp. 1-151.
Office action received for corresponding European Patent Application No. 19847710.1, dated Aug. 8, 2024, 5 pages.

* cited by examiner

NETWORK FUNCTION AUTHENTICATION BASED ON PUBLIC KEY BINDING IN ACCESS TOKEN IN A COMMUNICATION SYSTEM

RELATED APPLICATION

This application claims priority to PCT Application No. PCT/FI2019/050574, filed on Aug. 2, 2019, which claims priority to IN Application No. 201841030136, filed on Aug. 10, 2018, each of which is incorporated herein by reference in its entirety.

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. For example, authorization of access to services is one example of security management in a 5G network. However, service access authorization presents several challenges in existing 5G approaches.

SUMMARY

Illustrative embodiments provide improved techniques for security management in communication systems particularly with respect to service access authorization.

For example, in one illustrative embodiment, a method comprises the following steps. A request is received at an authorization entity for access to a service producer by a service consumer, wherein the request comprises a public key of the service consumer. The authorization entity generates an access token, wherein the generating step comprises binding the public key of the service consumer with the access token. The authorization entity sends the access token with the public key bound thereto to the service consumer.

In another embodiment, a method comprises the following steps. A service consumer receives an authorization token from an authorization entity for access to a service producer, wherein the access token has a public key of the service consumer bound thereto. The service consumer digitally signs the access token using a private key of the service consumer that corresponds to the public key bound to the access token to form a digital signature. The service consumer sends the access token with the public key bound thereto and the digital signature to the service producer.

In a further embodiment, a method comprises the following steps. A service producer receives an authorization token with a digital signature from a service consumer. The access token has a public key of the service consumer bound thereto and the digital signature has been formed by the service consumer using a private key of the service consumer that corresponds to the public key bound to the access token to digitally sign the access token. The access token is validated and the public key of the service consumer is obtained from the access token. The digital signature is verified using the obtained public key of the service consumer. The service consumer is authorized when the access token is successfully validated and the digital signature is successfully verified.

One or more illustrative embodiments are implemented in a roaming scenario involving more than one communication network (e.g. visited and home public land mobile networks), while one or more other illustrative embodiments are implemented in a non-roaming scenario involving one communication network.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Figure 1:
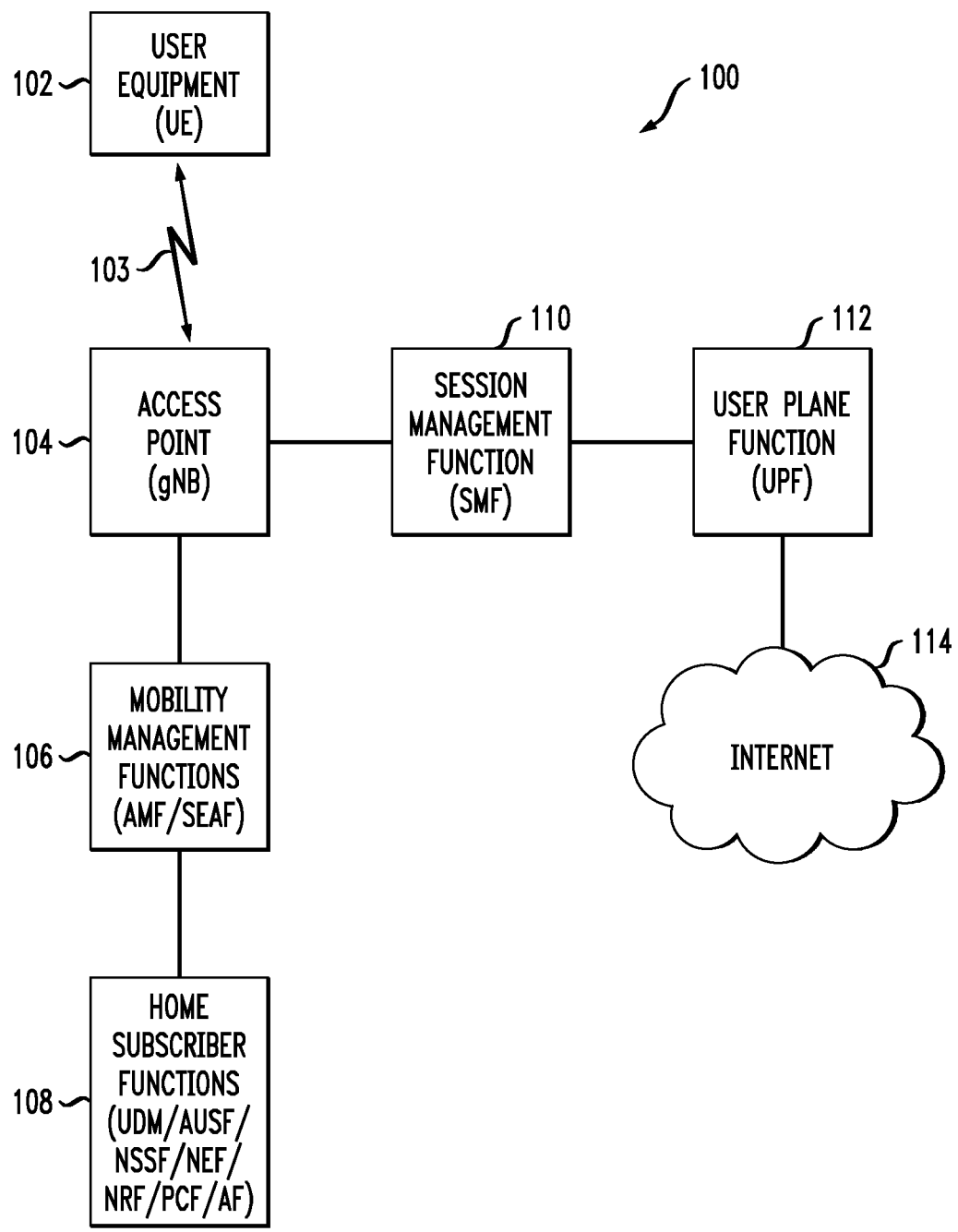
FIG. 1 illustrates a communication system with which one or more illustrative embodiments are implemented.

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Function Repository Function (NRF, also sometimes referred to as a Network Repository Function), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
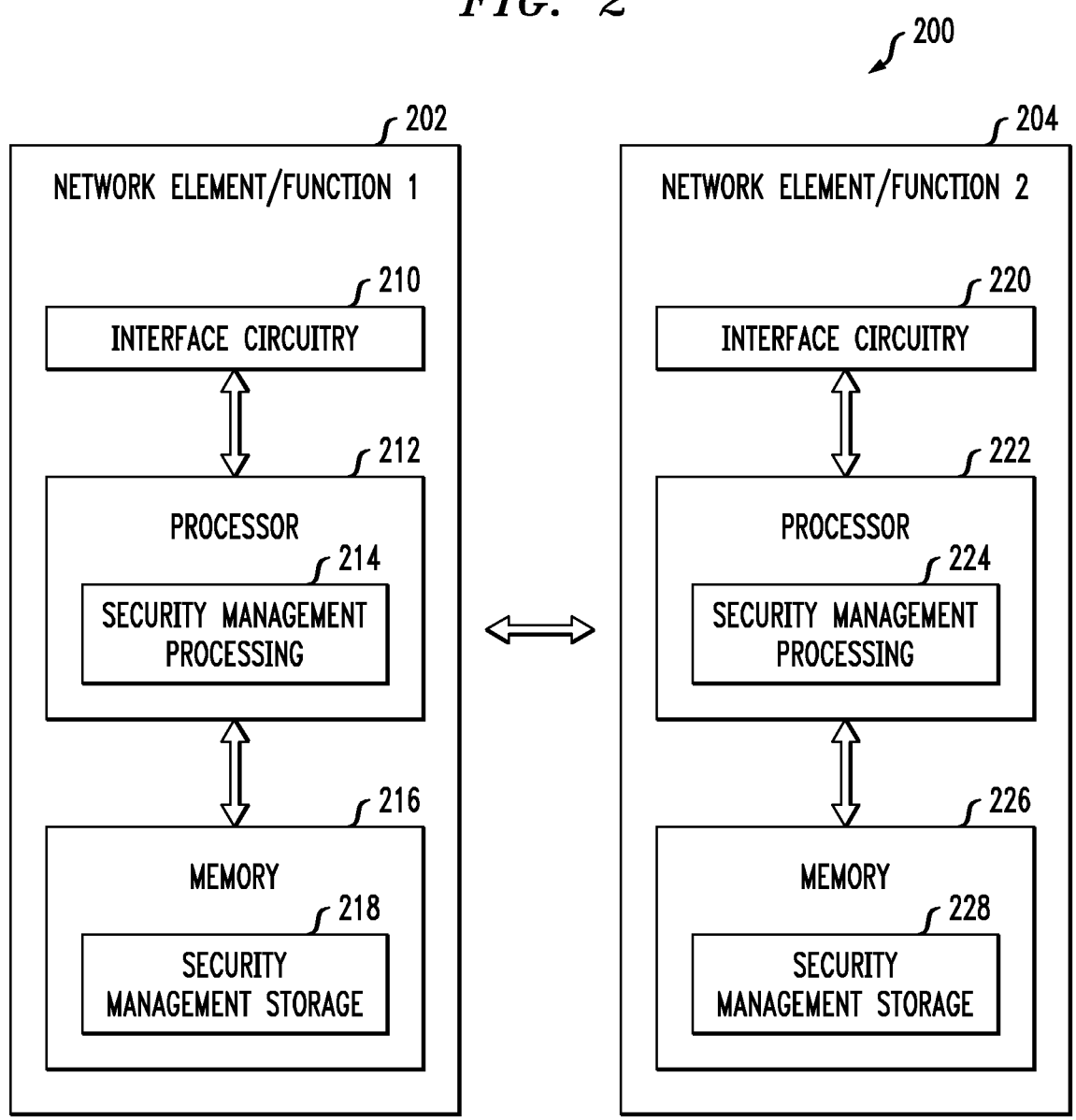
FIG. 2 illustrates network elements/functions for providing security management with which one or more illustrative embodiments are implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between, as well as to, the network elements/functions 202 and 204. The term "data" as used herein is intended to be construed broadly, so as to encompass any type of information that may be sent between network elements/functions (as well as between user equipment and a core network) including, but not limited to, messages, tokens, identifiers, keys, indicators, user data, control data, etc.

Thus, in one example, network element/function 202 is a NF, such as an AMF, and network element/function 204 is an NRF. In such case, the AMF and the NRF participate in a service access authorization methodology (discovery and selection) and exchange messages/data as needed. Such service access authorization methodology will be further described below. FIG. 2 can alternatively represent two NRFs in communication with one another or two NFs in communication with one another.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Figure 3:
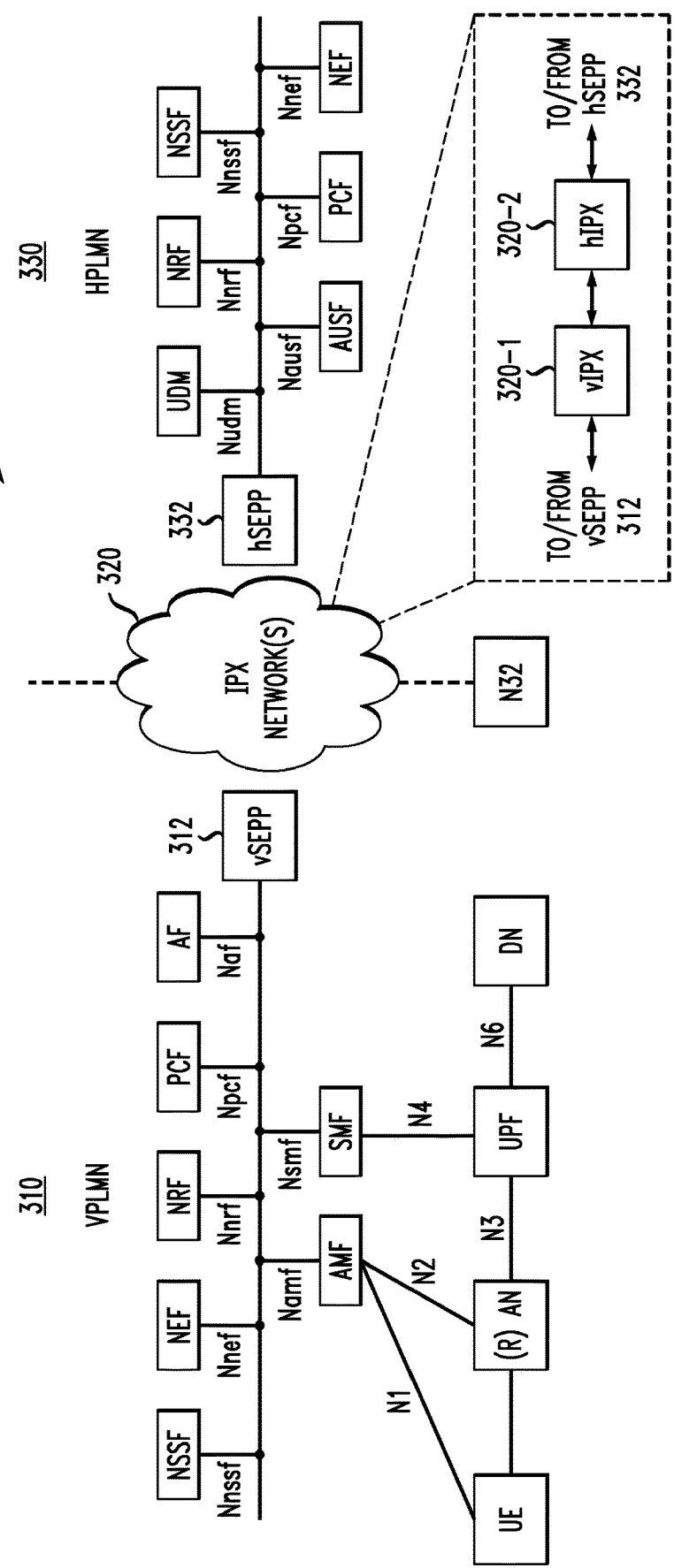
FIG. 3 illustrates a communication system architecture with network functions interacting between and within a visited network and a home network with which one or more illustrative embodiments are implemented.

FIG. 3 depicts a 5G architecture 300 in a configuration comprising a visited public land mobile network (VPLMN) 310 operatively coupled via an intermediate Internetwork Packet Exchange (IPX) network 320 to a home public land mobile network (HPLMN) 330. FIG. 3 also illustrates the presence of a Security Edge Protection Proxy (SEPP) at the edge of each PLMN, i.e., vSEPP 312 in VPLMN 310 and hSEPP 332 in HPLMN 330.

Note that there can be more than one IPX network operatively coupled between VPLMN 310 and HPLMN 330. For example, in the exploded view of IPX network 320 (denoted by the dashed outline box in FIG. 3), there are two IPX networks shown. vIPX 320-1 is the trusted IPX network associated with vSEPP 312, while hIPX 320-2 is the trusted IPX network associated with hSEPP 332.

It is to be appreciated that the various network functions shown in the VPLMN 310 and the HPLMN 330 are known and described in detail in various 5G specifications such as, but not limited to, the above-referenced TS 23.501 and TS 33.501.

As mentioned above, in 5G, SBA is introduced to model services as network functions (NFs) that communicate with each other using RESTful application programming interfaces (Representational State Transfer APIs). In the scenario where the two communicating NFs are in two different PLMNs (e.g., VPLMN 310 and HPLMN 330), communication happens over a roaming inter-network interface (N32) between the two participating PLMNs.

To protect NF specific content in the messages that are sent over the roaming inter-network interface, 5G introduces the SEPP as the entity residing at the perimeter of the PLMN network to protect the PLMN from outside traffic and additionally to implement transport layer security (TLS) and application layer security (ALS) for all the data and signalling exchanged between two inter-network network functions at the service layer. For example, the SEPP performs security management functions on information elements (IE) in HyperText Transport Protocol (HTTP) messages before the messages are sent externally over the roaming N32 interface. The protected HTTP messages are referred to as N32 messages. Protection such as ALS involves protecting information sent in various parts of the HTTP message including, but not limited to, HTTP Request/Response Line, HTTP header and HTTP Payload. However, some parts of this message may need to be modified by intermediaries (e.g., network provider of IPX 320 as shown in FIG. 3) between the two SEPPs.

Thus, in 5G SBA, the PLMN operator deploys a SEPP at the edge of its network to interoperate and obtain services from network functions in its roaming partner networks. The SEPP interfaces with one or more other SEPPs in one or more other networks over the N32 interface. As an edge proxy, the SEPP implements ALS as mentioned above to protect HTTP messages exchanged between a network function in its network and another network function in the roaming partner network.

While two NFs can be in different PLMNs as FIG. 3 illustrates, some NFs in the same PLMN also have a need to communicate. In either scenario (inter-PLMN communication or intra-PLMN communication), the SBA communication model includes security methods that enable an "NF service consumer" (service client) to be authenticated and authorized to access a service provided by or otherwise associated with an "NF service producer" (service server). One of the supported authorization methods in the above-referenced 3GPP TS 33.501 (Release 15) is based on the OAuth 2.0 access token methodology. In a 5G system, the following model is adopted when OAuth 2.0 is used: (i) the NRF is the OAuth 2.0 authorization server; (ii) the NF service consumer is the OAuth 2.0 client; and (iii) the NF service producer is the OAuth 2.0 resource server.

The NF service consumer (client) discovers the NF service producer (resource server) via the NRF, and then obtains an access token to present to the NF service producer when invoking the service API request.

Given the general concepts described above, illustrative embodiments that address certain security management issues will now be described. More particularly, illustrative embodiments provide improved security management techniques for 5G systems. The architecture for 5G systems is currently being standardized in 3GPP. As mentioned above, 3GPP TS 23.501 defines the 5G system architecture as service-based, e.g., Service-Based Architecture (SBA), while 3GPP TS 33.501 defines security management details.

More particularly, TS 33.501 clause 5.9.2.1 specifies security requirements for service registration, discovery and authorization including: (i) NF service-based discovery and registration shall support confidentiality, integrity, and replay protection; (ii) NRF shall be able to ensure that NF discovery and registration requests are authorized; (iii) NF service-based discovery and registration shall be able to hide the topology of the available/supported NFs in one administrative/trust domain from entities in different trust/administrative domains (e.g., between NFs in visited and the home networks); (iv) NF service request and response procedure shall support mutual authentication between NF consumer and NF producer; and (v) each NF shall validate all incoming messages (messages that are not valid according to the protocol specification and network state shall be either rejected or discarded by the NF).

It is realized herein that challenges exist for the above requirement that the NF service request and response procedure support mutual authentication between the NF consumer and the NF producer in the roaming scenario where the NF service consumer and the NF service producer are in two different networks. There is currently no explicit authentication of the NF service consumer (NFc) by the NF service producer (NFp) in 5G roaming scenarios.

In existing 5G specifications (e.g., TS 33.501), NFc authentication in roaming scenarios is based on an implicit authentication model which relies on successful authentication of the intermediate hops between NFc and NFp. In other words, assume the path between NFc (in a visited network such as VPLMN 310 in FIG. 3) and NFp (in a home network such as HPLMN 330 in FIG. 3) is as follows: NFc - - - vSEPP - - - vIPX - - - hIPX - - - hSEPP - - - NFp.

The existing authentication model between NFc and NFp is based on each hop authenticating each other. Therefore, NFc mutually authenticates with vSEPP, vSEPP likewise mutually authenticates with vIPX and so on. The NFp in the home network relies on the fact that NFc is authenticated by vSEPP and all the hops between vSEPP and itself are mutually authenticated, and that NFp trusts NFc implicitly.

Illustrative embodiments address the above and other challenges by providing an explicit authentication mechanism between an NF service consumer (NFc) and an NF service producer (NFp) in roaming scenarios. This enables NFp in the home network to directly authenticate the NFc in the visited network before granting service to the consumer.

Figure 4A:
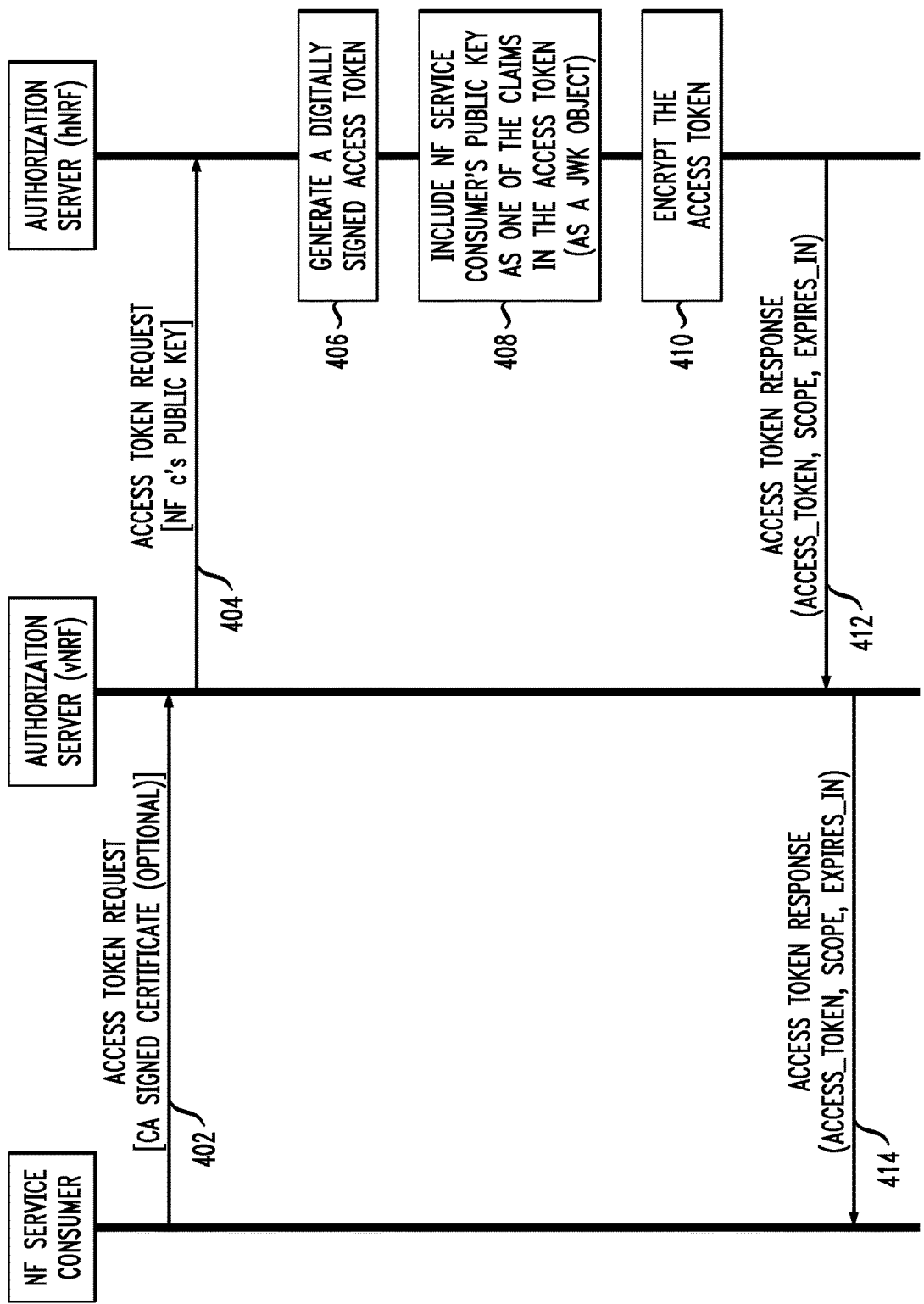
FIG. 4A illustrates a methodology for generating an access token for use in service access authorization in a communication system, according to an illustrative embodiment.
Figure 4B:
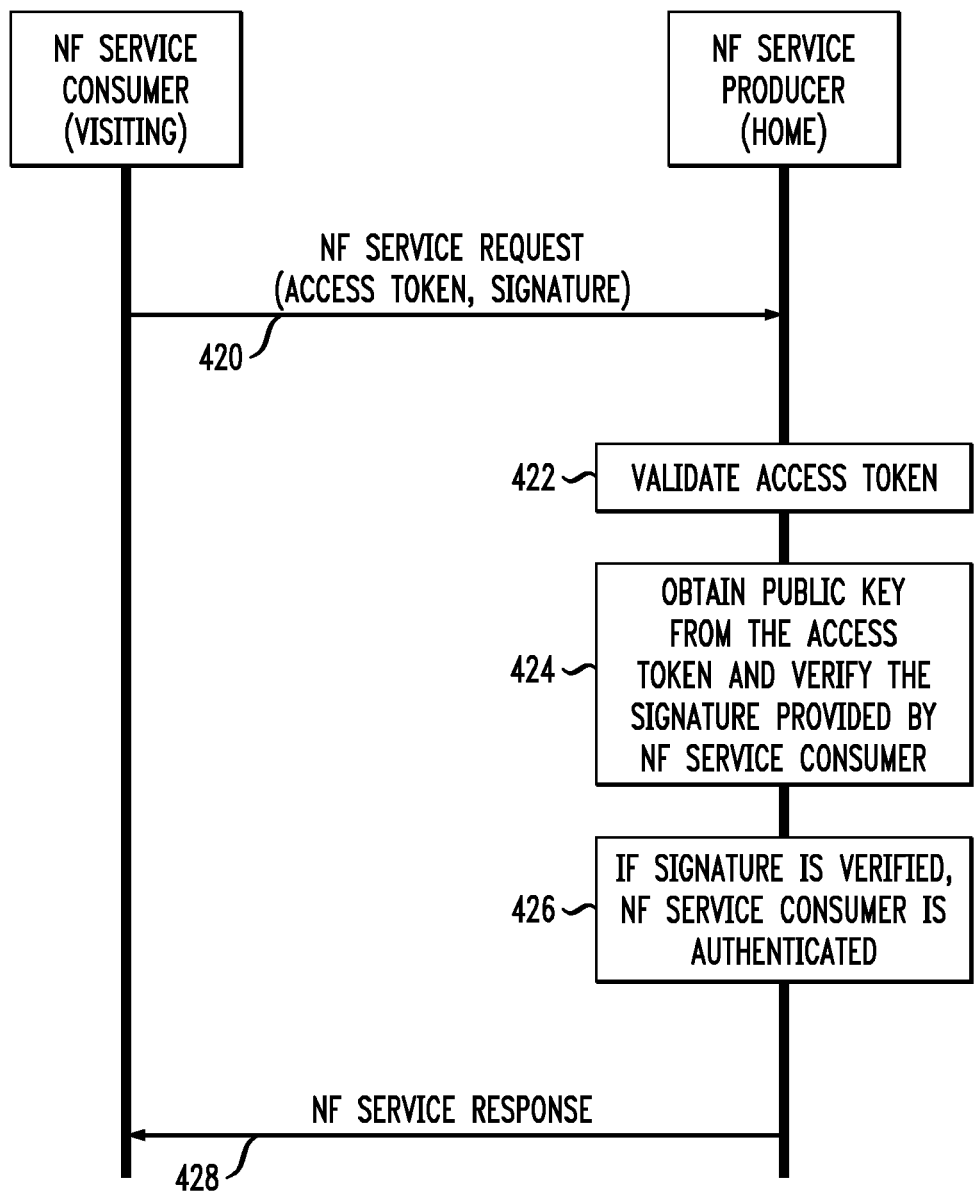
FIG. 4B illustrates a methodology for service access authorization in a communication system, according to an illustrative embodiment.

As will be further illustrated and described in the context of FIGS. 4A and 4B, in illustrative embodiments, a mechanism for explicit authentication of the NFc by the NFp in roaming scenarios comprises:

i) The trusted certificate authority (CA) certified public key of NFc is bound to the access token generated by the NRF of the home network (hNRF).

ii) NFc in the visited network demonstrates that it is in possession of the corresponding private key by digitally signing the access token received from hNRF.

iii) NFc in the visited network includes the digital signature in the API request to the NFp in the home network.

iv) NFp in the home network authenticates NFc by checking the signature against the public key bound in the access token.

Accordingly, illustrative embodiments bind together the NF consumer's certified public key (with NF instance identifier or ID) and an access token, and combine such binding with a signature-based mechanism used by the NF consumer to prove that it is holding the corresponding private key for further verification by the NF producer.

It is to be appreciated that the terms "bind," "binding," "bound to," and the like, as used herein with respect to the public key of the service consumer and the access token are intended to be broadly construed so as to refer to an association between the public key and the access token. In one or more illustrative embodiments described below, the public key is included as a claim in the access token. However, other techniques for binding (associating) the public key with the access token are contemplated to be within the scope of alternative embodiments.

More particularly, illustrative embodiments authenticate a NF service consumer based on the NF service consumer proving that it is in possession of the private key that is associated with NF service consumer's public key that is bound (included) by the NRF in the access token.

In accordance with one or more illustrative embodiments, the authentication mechanism will be explained as comprising three parts:

Part 1: Binding NF service consumer's certified public key in the access token generated by the NRF.

Part 2: NF service consumer proves that it is in possession of the corresponding private key by digitally signing the access token and including the signature in the API request to the NF service producer Part 3: NF service producer cryptographically confirms that it is talking to the correct NF service consumer by verifying the signature on the access token.

However, it is to be appreciated that portions of any given part may be performed in one or more of the other parts, and the authentication mechanism may be considered as having less or more parts than the three illustratively delineated herein.

Part 1: Binding NF Service Consumer's Public Key in the Access Token

In existing 5G specifications, the NF service consumer (NFc) in the visited network executes the Access Token Request procedure (see, e.g., clause 13.4.1.2 of TS 3GPP 33.501) to obtain an access token from the authorization server (i.e., NRF or, more generally, an "authorization entity") in the home network. The request is sent over a mutually authenticated secure connection (e.g., either Transport Layer Security (TLS) or Internet Protocol Security (IPSec)) between NFc and visited NRF.

Illustrative embodiments enhance the procedure in the NRF as follows:

a) The NF service consumer's certified public key is included in the access token request sent by the visiting NRF to the home NRF. In one or more illustrative embodiments, the access token is in the JSON Web Token (JWT) format as described in Internet Engineering Task Force (IETF) Request for Comments (RFC) 7519, "JSON Web Token (JWT)," May 2015, the disclosure of which is incorporated by reference herein in its entirety. It is to be appreciated that while one or more illustrative embodiments describe the access token in the context of a JSON Web token and the public key as a JSON Web key, alternative embodiments are implementable in a straightforward manner with other token formats and key formats.

b) NF service consumer's public key is included in the JWT based access token that is generated by the home NRF.

c) The public key is represented as a JSON Web Key (JWK) and included in the JWT formatted access token as a separate claim. JWK is described in Internet Engineering Task Force (IETF) Request for Comments (RFC) 7517, "JSON Web Key (JWK)," May 2015, the disclosure of which is incorporated by reference herein in its entirety.

In some embodiments, the NF service consumer's public key/private key pair used for client authentication during TLS is reused by the visiting NRF when it forwards the access token request to the home NRF.

d) In alternative embodiments, a separate asymmetric key pair is used. In this case, the NF service consumer is also responsible to share the certified public key with the visited NRF, either during Access Token Request or during service discovery. The visited NRF validates the certificate before using NF service consumer's public key in the certificate.

One ordinarily skilled in the art will appreciate the cryptographic relationships and usages of public key/private key pairs and other asymmetric key pairs.

Part 2: NF Service Consumer Digitally Signs the Access Token and Includes the Signature in the API Request to NF Service Producer This part describes enhancements in the NF service consumer once it receives the access token (from Part 1).

a) The NF service consumer digitally signs the access token received in the Access Token Response (see, e.g., Figure 13.4.1.1-1 in TS 33.501) using the private key associated with the public key added as a claim in the access token.

Note that, in part 1, it is possible that the home NRF has ciphered the access token that is returned to the NF service consumer in the Access Token Response. The digital signature is then computed on the ciphered access token.

b) The signature is then included in the API request to the selected NF service producer instance.

Note that the access token is also included, as per existing functionality.

Part 3: NF Service Producer Verifies the Digital Signature Using the Public Key in the Validated Access Token In this part, the NF service producer takes the public key from the validated access token and verifies NF service consumer's signature. If the verification succeeds, the NF service producer has successfully authenticated the NF service consumer.

Note that while validation of the access token is not within scope of the illustrative descriptions herein, the access token is validated first before the public key is taken from the access token.

Note also that validation of the access token is performed directly by the NF service producer or indirectly by invoking a token verification service on the NRF. If the token is ciphered, then the NF service producer first decrypts the token before executing the validation procedure on it.

FIGS. 4A and 4B will now be described to illustrate the message flows for the above-described access token request procedure with NF authentication in accordance with illustrative embodiments.

1. NF service consumer (NFc) authenticates with its local NRF (i.e., vNRF or authorization server in FIG. 4A). As used herein, an authorization server or NRF may be, more generally, referred to as an authorization entity. Note that if the connection between NFc and vNRF is based on TLS, then this step is skipped.

2. NF service consumer shares its public key with vNRF. Note that this step is implicitly performed during the TLS handshake or explicitly performed using one of the existing NF-NRF procedures (NF registration or service discovery or access token request).

Note that steps 1 and 2 above are not expressly depicted in FIG. 4A.

3. NF service consumer requests an access token from its vNRF. In some embodiments, NF service consumer includes its CA signed certificate (with the public key) in this API request. See step 402 in FIG. 4A.

4. vNRF forwards the access token request to hNRF (where the NF service producer instance is located). hNRF is also referred to as an authorization server (or, more generally, an authorization entity). The vNRF includes NFc's public key in this API request. See step 404 in FIG. 4A.

5. The hNRF generates an access token (see step 406 in FIG. 4A), and inserts NFc's public key as one of the claims in the token, e.g., as a JSON Web Key object (see step 408 in FIG. 4A).

Note that the JWK is included directly as a claim value or the JWT includes a TLS-secured uniform resource identifier (URI) from which to retrieve the JWK value.

6. hNRF ciphers (encrypts) the access token (see step 410 in FIG. 4A) and provides it to the NF service consumer with the access token response (see step 412 in FIG. 4A). The response message, in one or more illustrative embodiments, also includes scope and expiration parameters as per the existing 5G specifications.

7. The NF service consumer receives the access token (see step 414 in FIG. 4A) in the access token response transmitted to it by hNRF through vNRF.

8. Turning now to FIG. 4B, the NF service consumer digitally signs the ciphered access token using the associated private key of the public-key shared with the NRF in step 2 and includes the resulting signature and the access token in the API request to the selected NF service producer instance. See step 420 in FIG. 4B.

9. NF service producer decrypts the ciphered access token—on its own if it is in possession of the NRF public key or by calling a separate API on NRF.

10. NF service producer validates the access token—on its own or itself or by calling access token validation service in NRF. See step 422 in FIG. 4B.

11. If the access token is valid, NF service producer verifies the signature using the public key included by NRF in the access token. See step 424 in FIG. 4B.

12. If verification of digital signature is successful, the NF service consumer is authenticated. See step 426 in FIG. 4B.

13. The NF service consumer is notified by the NF service producer that it can access the subject service in NF service response. See step 428 in FIG. 4B.

It is to be appreciated that while one or more illustrative embodiments are described herein with the NFc and NFp in different PLMNs, alternative embodiments comprise implementations with the NFc and NFp in the same PLMN. Likewise, alternative embodiments comprise implementations with the NRF that generates the access token being in the same PLMN as the NFc, while the NFp is also in the same PLMN or in a different PLMN.

The particular processing operations and other system functionality described in conjunction with the message flow diagrams of FIGS. 4A and 4B are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:

1. A method comprising:
receiving, at an authorization entity, a request for access to a network function (NF) service producer by a NF service consumer over a mutually authenticated secure connection, wherein:
the NF service consumer and the NF service producer are each different network functions (NFs) in a 5G communication system,
the request comprises a public key of the NF service consumer in a public key/private key pair, and
the authorization entity comprises a home network repository function associated with a home network of the NF service producer and the home network repository function is an authorization server used by the NF service consumer to discover the NF service producer and then obtain an access token for accessing services of the NF service producer;
generating, at the authorization entity, the access token, wherein the generating step comprises binding the public key of the NF service consumer with the access token; and
sending, from the authorization entity, the access token with the public key bound thereto to the NF service consumer, the NF service consumer proving that it is holding a corresponding private key for further verification by the NF service producer by digitally signing the access token, including the public key, and including the signature in a request to the NF service producer, wherein:
the NF service producer in the home network directly authenticates the NF service consumer in a visited network before granting service to the NF service consumer by comparing the digital signature with the public key bound in the access token;
the access token is encrypted by the authorization entity prior to the sending of the access token; and
the authorization entity is executed by at least one processing device comprising a processor operatively coupled to a memory.

2. The method of claim 1, wherein the public key of the NF service consumer is a certified public key obtained from a certification authority.

3. The method of claim 1, wherein the access token comprises a JavaScript Object Notation (JSON) Web token (JWT).

4. The method of claim 3, wherein the public key comprises a JSON Web key (JWK) and wherein the generating step comprises including the JWK of the NF service consumer in the JWT based access token as a separate claim, wherein the JWK is included directly as a claim value or the JWT includes a Transport Layer Security (TLS)-secured uniform resource identifier (URI) from which to retrieve a JWK value.

5. The method of claim 1, wherein the authorization entity is part of a same communication network as the NF service producer.

6. The method of claim 5, wherein the authorization entity receives the request from another authorization entity that is part of a same communication network as the NF service consumer.

7. The method of claim 1, wherein the NF service consumer is part of a same communication network as the NF service producer.

8. The method of claim 1, wherein the NF service consumer is part of a different communication network than the NF service producer.

9. An article of manufacture comprising a non-transitory computer-readable storage medium having embodied therein executable program code that when executed by a processor associated with an authorization entity causes the processor to:
receive, at the authorization entity, a request for access to a network function (NF) service producer by a NF service consumer over a mutually authenticated secure connection, wherein:
the NF service consumer and the NF service producer are each different network functions (NFs) in a 5G communication system,
the request comprises a public key of the NF service consumer in a public key/private key pair, and
the authorization entity comprises a home network repository function associated with a home network of the NF service producer and the home network repository function is an authorization server used by the NF service consumer to discover the NF service producer and then obtain an access token for accessing services of the NF service producer;
generate, at the authorization entity, the access token, wherein the generating step comprises binding the public key of the NF service consumer with the access token; and
send, from the authorization entity, the access token with the public key bound thereto to the NF service consumer, wherein the NF service consumer proves that it is holding a corresponding private key for further verification by the NF service producer by digitally signing the access token, including the public key, and including the signature in a request to the NF service producer, wherein the NF service producer in the home network directly authenticates the NF service consumer comparing the digital signature with the public key bound in the access token before granting service to the NF service consumer, wherein the access token is encrypted by the authorization entity prior to the sending of the access token.

10. Apparatus comprising at least one processor coupled to a memory associated with an authorization entity and configured to:
receive a request for access to a network function (NF) service producer by a NF service consumer over a mutually authenticated secure connection, wherein:
the NF service consumer and the NF service producer are each different network functions (NFs) in a 5G communication system,
the request comprises a public key of the NF service consumer in a public key/private key pair, and
the authorization entity comprises a home network repository function associated with a home network of the NF service producer and the home network repository function is an authorization server used by the NF service consumer to discover the NF service producer and then obtain an access token for accessing services of the NF service producer;
generate the access token, wherein the generating step comprises binding the public key of the NF service consumer with the access token; and
send the access token with the public key bound thereto to the NF service consumer wherein the NF service consumer proves that it is holding a corresponding private key for further verification by the NF service producer by digitally signing the access token, including the public key, and including the signature in a request to the NF service producer, and wherein:
the NF service producer directly authenticates the NF service consumer before granting service to the NF service consumer by comparing the digital signature with the public key bound in the access token, the access token is encrypted by the authorization entity prior to the sending step, and
the authorization entity comprises a home network repository function associated with a home network of the NF service producer.

11. A method comprising:
receiving, at a network function (NF) service consumer and in response to a request by the NF service consumer, an authorization token from an authorization entity for access to a NF service producer over a mutually authenticated secure connection, wherein:
the NF service consumer and the NF service producer are each different network functions (NFs) in a 5G communication system,
the request comprises a public key of the NF service consumer in a public key/private key pair,
the authorization entity comprises a home network repository function associated with a home network of the NF service producer and the home network repository function is an authorization server used by the NF service consumer to discover the NF service producer and then obtain an access token for accessing services of the NF service producer, and the public key of the NF service consumer is bound to the access token;
digitally signing, by the NF service consumer, the access token, including the public key bound thereto, using a private key of the NF service consumer that corresponds to the public key bound to the access token to form a digital signature, thereby proving that the NF service consumer is holding a corresponding private key, wherein the NF service producer in the home network directly authenticates the NF service consumer in a visited network before granting service to the NF service consumer;
sending, from the NF service consumer, the access token with the public key bound thereto and the digital signature to the NF service producer; and
wherein the NF service consumer is executed by at least one processing device comprising a processor operatively coupled to a memory.

12. The method of claim 11, wherein the access token comprises a JavaScript Object Notation (JSON) Web token (JWT).

13. The method of claim 12, wherein the public key comprises a JSON Web key (JWK) and wherein the generating step comprises including the JWK of the NF service consumer in the JWT based access token as a separate claim, wherein the JWK is included directly as a claim value or the JWT includes a Transport Layer Security (TLS)-secured uniform resource identifier (URI) from which to retrieve a JWK value.

14. The method of claim 11, wherein the authorization entity is part of a same communication network as the NF service producer.

15. The method of claim 14, wherein the NF service consumer receives the authorization token from another authorization entity that is part of a same communication network as the NF service consumer.

16. A communication system comprising:
a first communications network comprising:
a network function (NF) service consumer; and
a first authentication server;
a second communications network comprising:
an NF service producer; and
a second authentication server;
the first authentication server configured to:
receive, from the NF service consumer, a request for an access token for access to the NF service producer over a mutually authenticated secure connection, the request comprising a public key of the NF service consumer from a public key/private key pair; and
transmit the request for the access token to the second authentication server;
the second authentication server configured to:
receive the request for the access token from the first authentication server;
based on the received request from the first authentication server, generate the access token;
binding the generated access token with the public key received in the received request by inserting the public key as a claim in the generated access token; and
send the bound access token to the NF service consumer;
the NF service producer configured to:
receive, from the NF service consumer, the bound access token comprising a digital signature digitally signed by the NF service consumer using the private key corresponding to the public key;

validate the bound access token;

based on validating the bound access token, validate the digital signature using the public key in the bound access token, wherein the digital signature signed by the NF service consumer using the private key proves, to the NF service producer, that the NF service consumer is holding the private key corresponding to the public key bound to the access token; and based on validating the bound access token and validating the digital signature, authenticate the NF service consumer for accessing a service provided by or otherwise associated with the NF service producer.

17. The communication system of claim 16, wherein the generated access token comprises a JavaScript Object Notation (JSON) Web token (JWT).

18. The communication system of claim 17, wherein the public key comprises a JSON Web key (JWK) and wherein binding the generated access token comprises including the JWK of the NF service consumer in the JWT based access token as the claim, wherein the JWK is included directly as a claim value.

19. The communication system of claim 17, wherein the public key comprises a JSON Web key (JWK) and wherein binding the generated access token comprises including the JWK of the NF service consumer in the JWT based access token as the claim, wherein the JWT includes a Transport Layer Security (TLS)-secured uniform resource identifier (URI) from which to retrieve a JWK value.

20. The communication system of claim 19, wherein the bound access token is encrypted by the second authentication server prior to sending of the bound access token to the NF service consumer.

* * * * *